Figure 1:
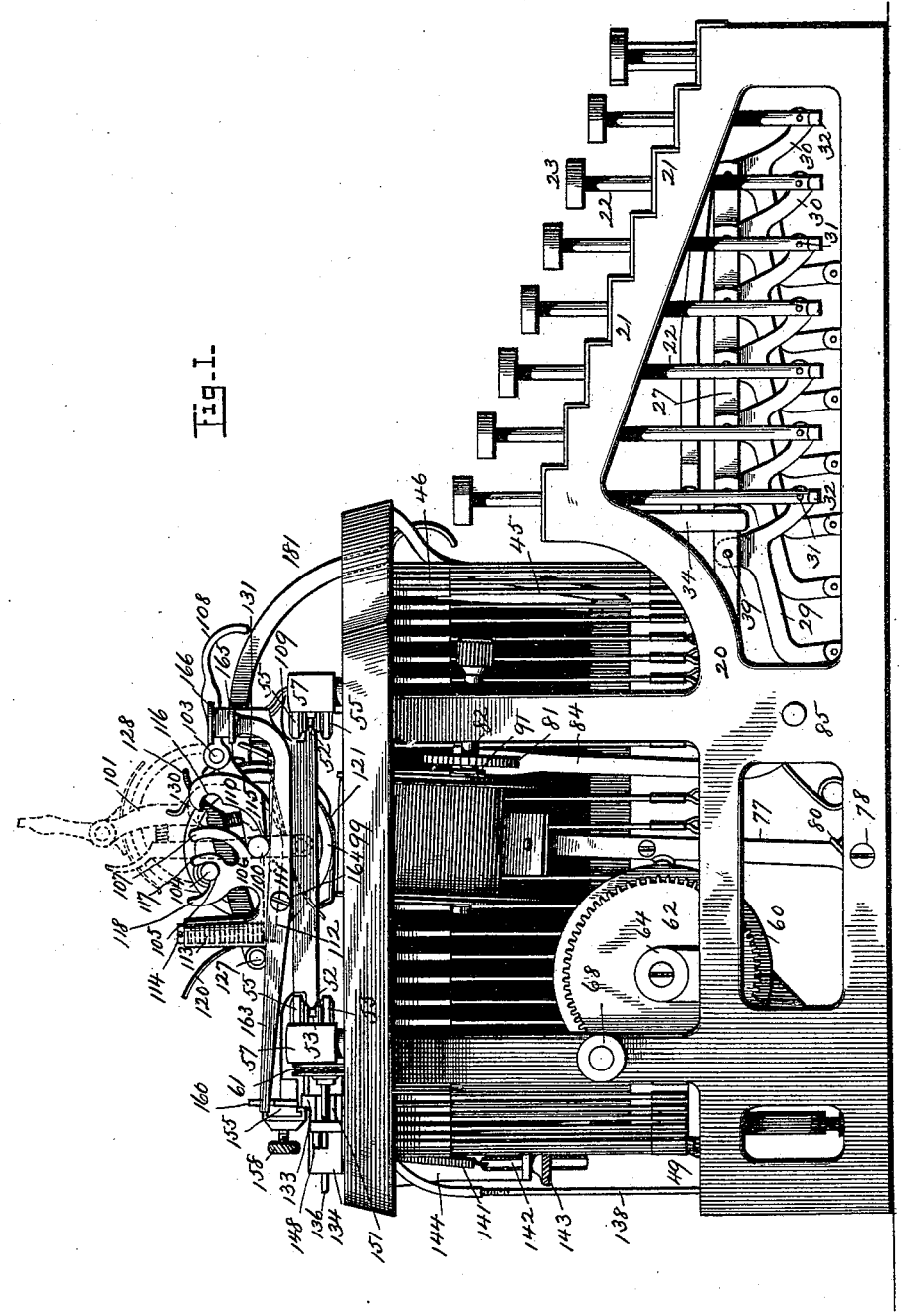

(No Model.) 7 Sheets—Sheet 1.

C. M. CLINTON & J. McNAMARA.
TYPE WRITING MACHINE.

No. 449,616. Patented Mar. 31, 1891.

(No Model.) 7 Sheets—Sheet 2.
C. M. CLINTON & J. McNAMARA.
TYPE WRITING MACHINE.
No. 449,616. Patented Mar. 31, 1891.
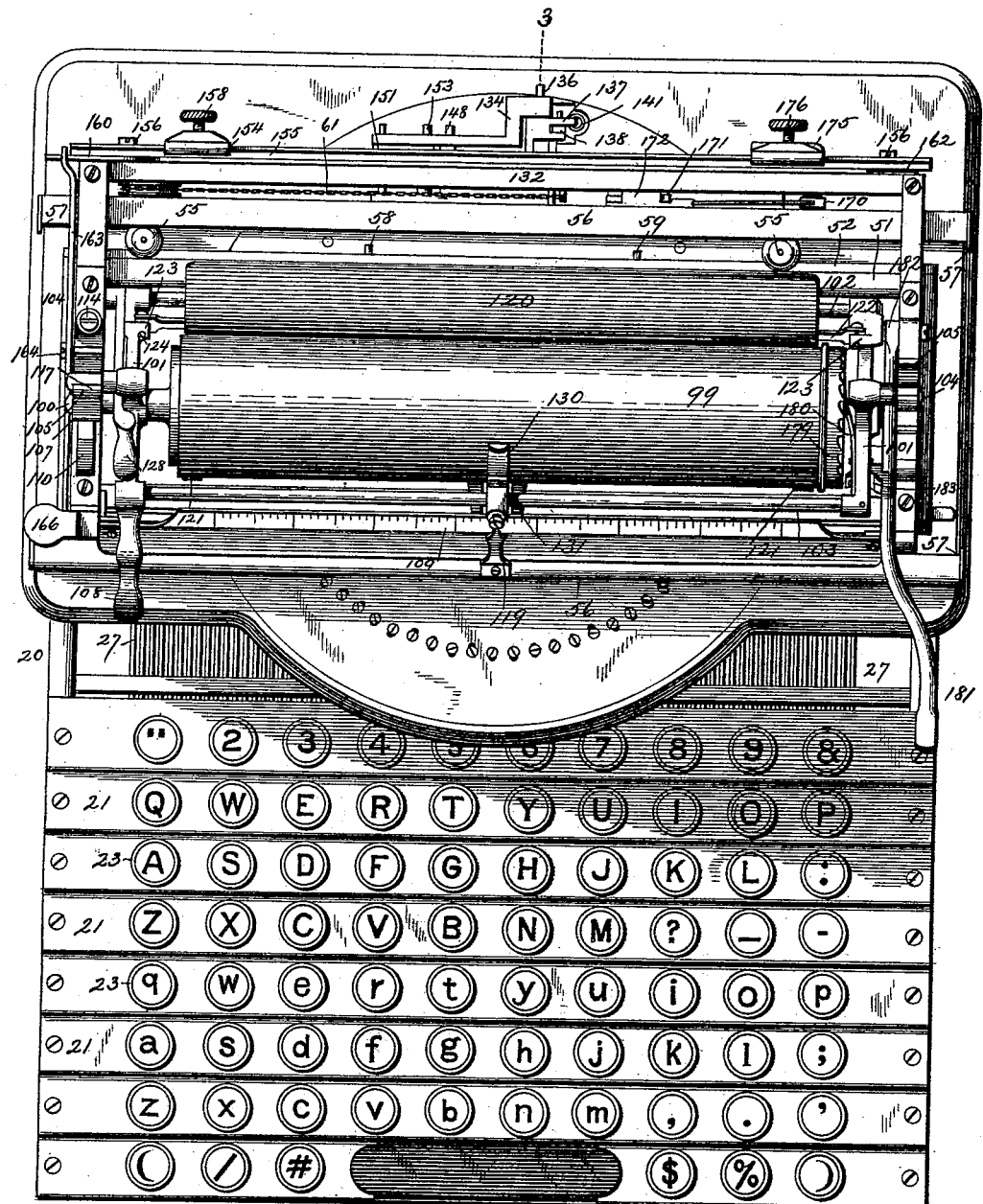
Fig. II.
Witnesses:
Inventors:
Charles M. Clinton,
James McNamara,
W. H. Stevens Atty.

(No Model.) 7 Sheets—Sheet 3.
C. M. CLINTON & J. McNAMARA.
TYPE WRITING MACHINE.
No. 449,616. Patented Mar. 31, 1891.
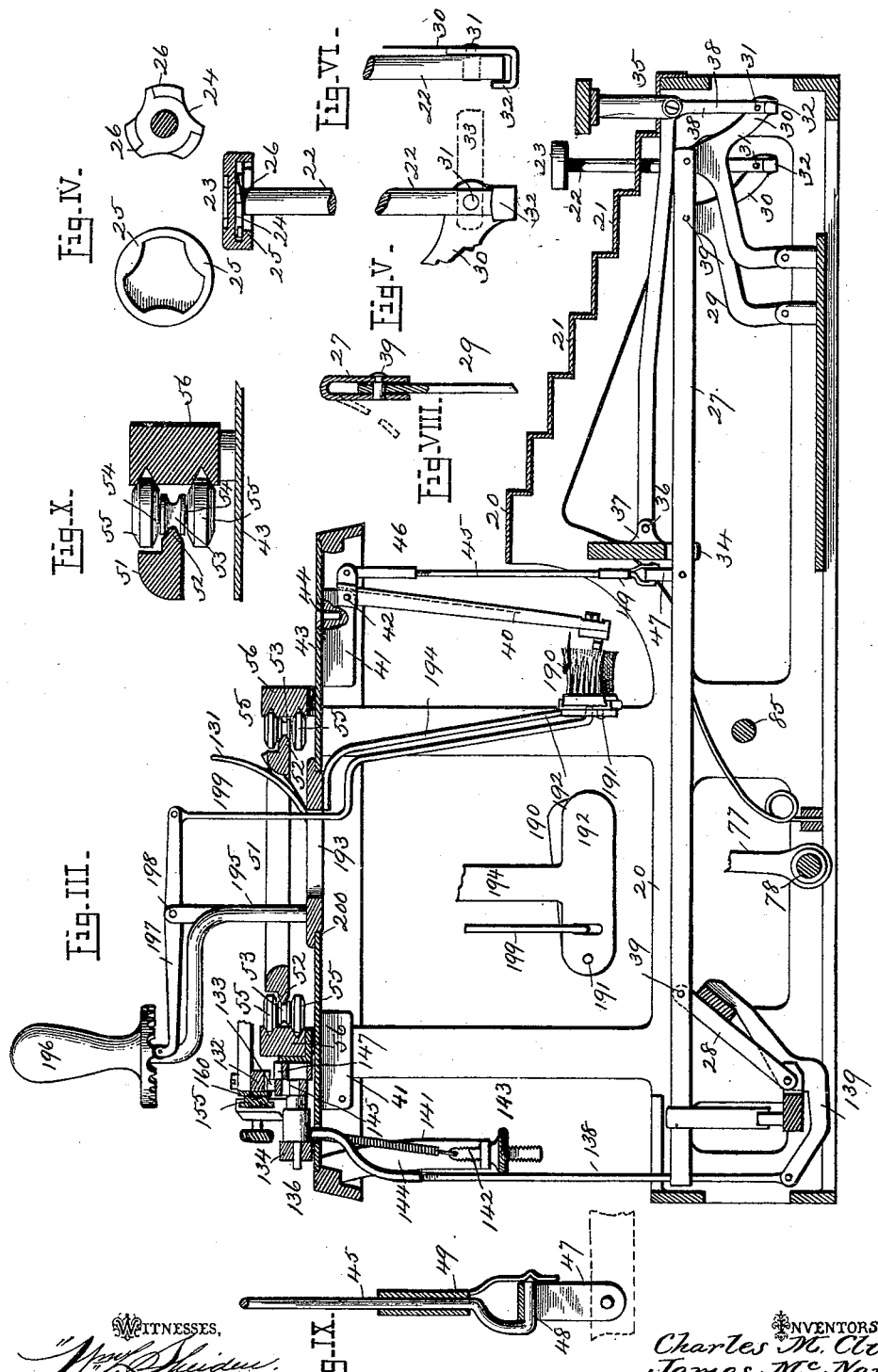
WITNESSES.
INVENTORS
Charles M. Clinton.
James McNamara.

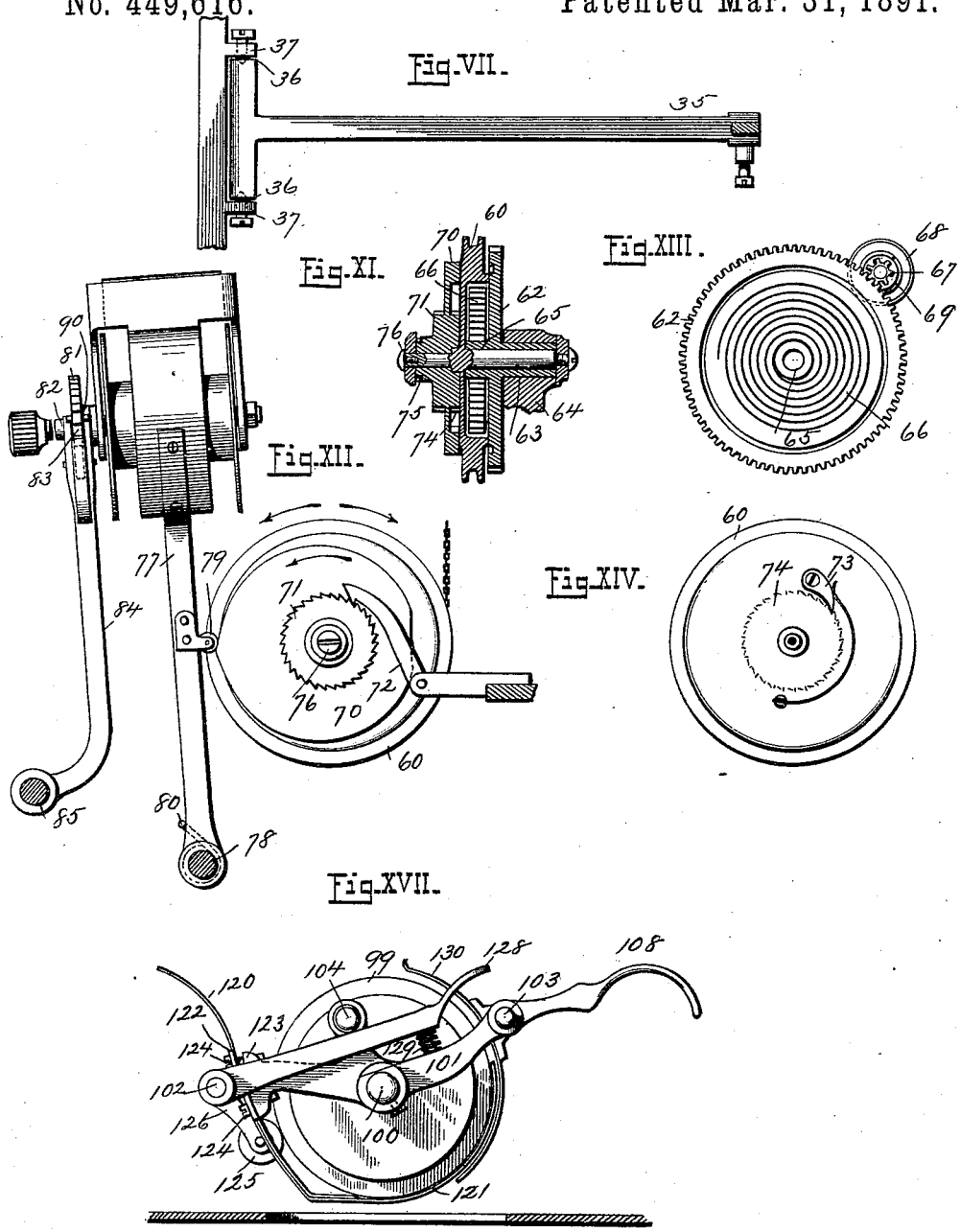

(No Model.) 7 Sheets—Sheet 5.
C. M. CLINTON & J. McNAMARA.
TYPE WRITING MACHINE.
No. 449,616. Patented Mar. 31, 1891.
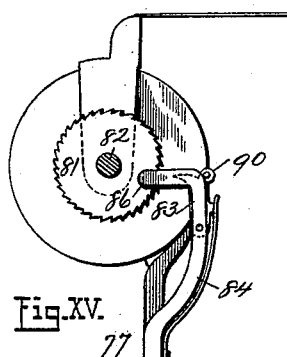
Fig. XV.
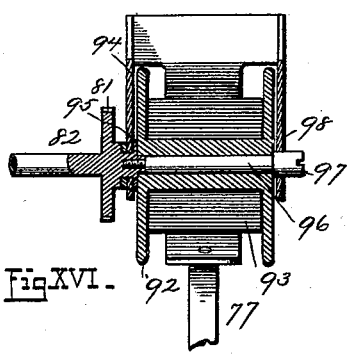
Fig. XVI.
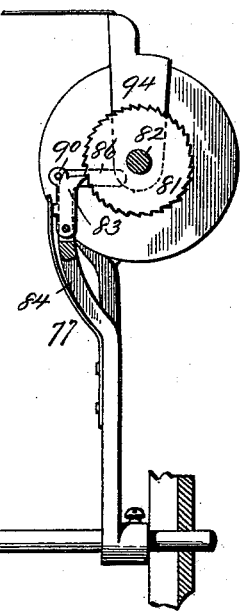
Fig. XXIII.
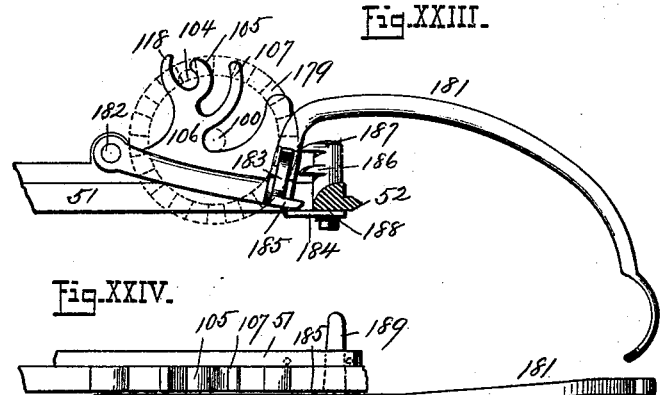
Fig. XXIV.
Fig. XXV.
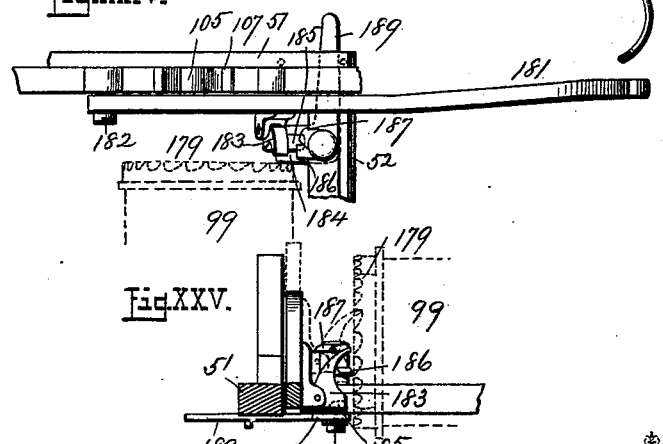
Witnesses:
Inventors
Charles M. Clinton,
James McNamara,
W. B. G. Stevens Atty.

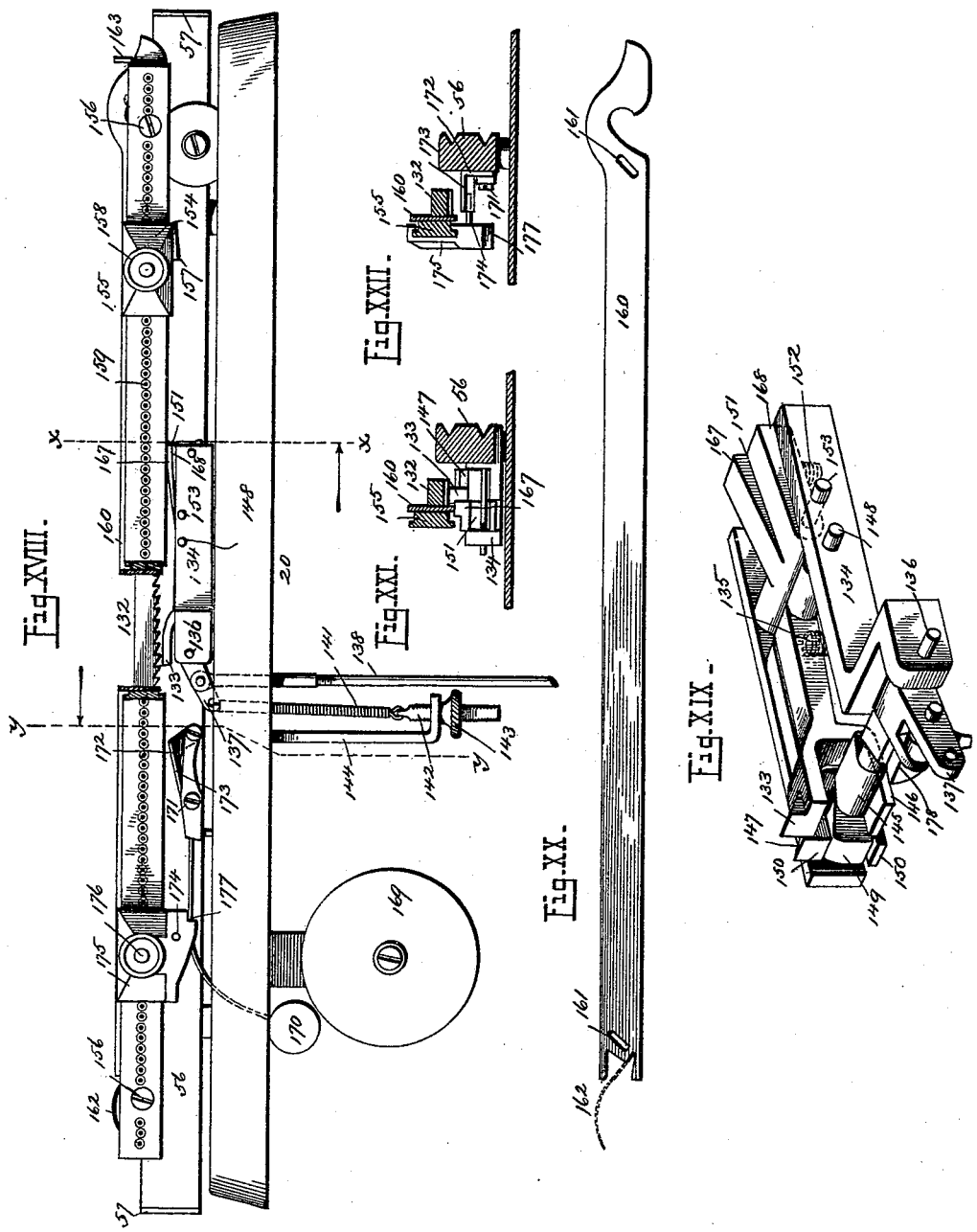

(No Model.) 7 Sheets—Sheet 7.
C. M. CLINTON & J. McNAMARA.
TYPE WRITING MACHINE.
No. 449,616. Patented Mar. 31, 1891.
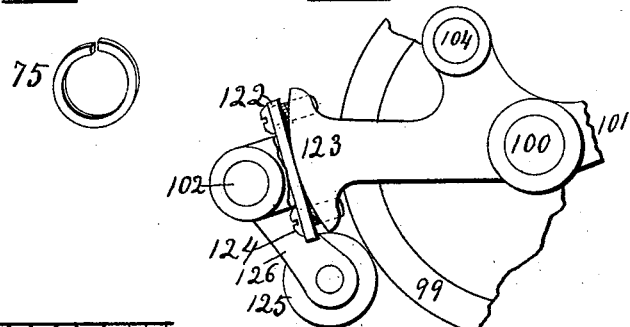
Fig XXVI. Fig XXVII.
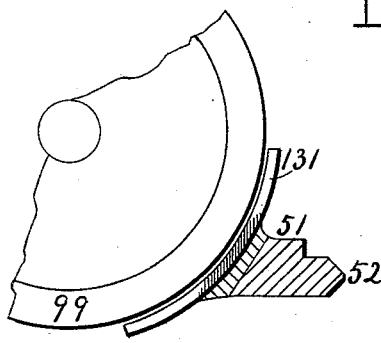
Fig XXVIII.
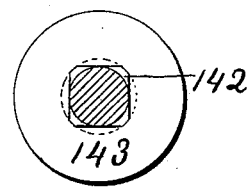
Fig XXX.
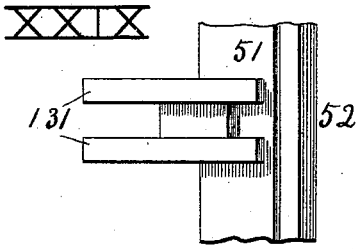
Fig XXIX.
WITNESSES.
P. E. Stevens
M. C. Hillyard
INVENTOR
Charles M. Clinton,
James McNamara,
W. E. Stevens ATTY.

UNITED STATES PATENT OFFICE.

CHARLES M. CLINTON AND JAMES McNAMARA, OF ITHACA, NEW YORK.

TYPE-WRITING MACHINE.

SPECIFICATION forming part of Letters Patent No. 449,616, dated March 31, 1891.

Application filed December 15, 1890. Serial No. 374,746. (No model.)

*To all whom it may concern:*

Be it known that we, CHARLES M. CLINTON and JAMES MCNAMARA, citizens of the United States, residing at Ithaca, in the county of Tompkins and State of New York, have invented certain new and useful Improvements in Type-Writing Machines; and we do hereby declare the following to be a full, clear, and exact description of the invention, such as will enable others skilled in the art to which it appertains to make and use the same.

This invention relates to type-writing mahines, and its object is to render the action ·ht and even; to render the alignment of the ιe perfect, so that no strains by the most μid use of the machine can cause the type ·ι get out of line, and so that the original .lignment and realignment may be readily nade by any person; means for readily adjusting the length of the type-bar-connecting rods; means for readily attaching the key-stems to the crank-rockers; means for readily attaching the key-buttons to their stems, and means for causing the ribbon to advance both crosswise and lengthwise a little at every stroke of a key; (the latter object was attempted to be accomplished in a previous application of ours, Serial No. 349,573; but it was found that the crank motion did not accomplish the object with as much accuracy as we wish to attain, because when the crank was passing dead-centers the ribbon would at some times be held still and be worn dry at that point, and at other times the crank would throw past center, leaving a spot of ribbon unused, thus causing the ribbon in course of time to become spotted or blotty; and these objections we wish to obviate, for the purpose of making a uniform impression, by means of a perfectly uniform advance of the ribbon-feeding device;) means for increasing or diminishing the force of the carriage-feeding spring at any moment; means for attaching and releasing a ribbon-spool, so that new ribbons may be furnished to the trade on wooden spools, and such wooden spools be supplied directly for use on the machine, thus avoiding the disagreeable and dirty work of attaching the ribbon to machine-spools, and providing means for thus keeping the ribbons upon such spools in better condition as to moisture and straightness or flatness; means for hanging the spacing-lever so as to preserve its horizontal position and easy motion whether it be struck upon either extreme end or midway; means for adapting roller-bearings to the carriage-ways, whereby the carriage may continue its motion upon such rollers without perceptible resistance even though the rollers should have reached and be stopped at the end of their paths, and whereby such roller will be restored to its normal position at the succeeding reverse movement of the carriage; means for retaining the carriage at the exact tooth of the feed-rack to which it may be moved by hand; means for operating the detent-and-rack escapement and for adjusting the tension upon the spacing device; means for locating the width of the margin and for printing clear over such marginal lines without interruption of the machine when it is desirable to make lines the full width of the paper; means for disengaging the detent from the rack and the marginal stops by a single movement, so that the carriage may be freely moved either way across the machine to any desired point; means for sounding the bell before the end of a line is reached and of locking all the keys and the spacing-lever, so that they cannot be pressed down after the end of a line is reached, thus notifying the operator and preventing the possibility of printing a number of letters upon a single spot at the end of a line; means for hanging the impression or paper-carrying cylinder in rigidly-fixed bearings, so that the cylinder may be readily swung forward and upward for examining the work without revolving it upon its own center or dislocating the line of the paper upon which the print is being made, and means for readily removing the cylinder from the said fixed bearings, whereby hard and soft cylinders are rendered interchangeable, or change may be made from one letter to another without moving the paper from the roller; means for hanging the paper-guiding apron, whereby it may be rocked and adjusted to a rigidly-fixed position, as required for service; means for hanging the pressure-roller, whereby it may be moved away from the paper independently of the said apron, so that the apron will continue to guide the paper close to the cylinder, while the roller is pressed away to permit free passage of the paper; means for guiding the forward edges of the paper upward beneath the front paper-guide when first inserted; means for revolving the cylinder either one or two line-spaces and holding it rigidly when so revolved to prevent it being thrown past the line by a quick movement of the line-spacing lever, and yet permitting the cylinder to be revolved either forward or backward line by line or rapidly passing the lines without releasing the detent and with little effort, and mechanical means for thoroughly cleaning all the type by a simple crank movement.

To this end our invention consists in the construction and combination of parts forming a type-writing machine, hereinafter described and claimed, reference being had to the accompanying drawings, in which—

Figure I is a side elevation of a type-writing machine according to our invention, and Fig. II is a top or plan view of the same. Fig. III is a transverse vertical section at the line 3, Fig. II, showing also type-cleaning mechanism. Fig. IV is an under side view of the key-button and its stem-head detached, showing, also in vertical section, the same parts joined together. Fig. V is a side view of the key-stem hangings, and Fig. VI is a front view of the same. Fig. VII is a top view of the spacer-key and connections. Fig. VIII is an enlarged cross-sectional view of the draw-bar and brace-joint. Fig. IX is a side view of the type-rod and stirrup-connection. Fig. X is a cross-section of a carriage-rail and one set of rollers enlarged. Fig. XI is a longitudinal vertical section of the spring-wheel device for feeding the carriage. Fig. XII is an inner end view of the same in connection with the ribbon-spool hangings. Fig. XIII is a rear side view of the spring-winder. Fig. XIV is a face view of the spring-wheel behind the cam. Fig. XV is a front view of the ribbon-feeding braces. Fig. XVI is a longitudinal section of the merchantable wooden ribbon-spool mounted for service. Fig. XVII is a left-hand end view of the impression-cylinder and its attachments removed. Fig. XVIII is a rear side view in the region of the carriage-feeding escapement. Fig. XIX is a perspective view of the escapement. Fig. XX is a rear side view of the shifter-bar. Fig. XXI is a vertical section at line x, Fig. XVIII, showing the marginal stop device. Fig. XXII is a vertical section at line y, Fig. XVIII, showing the alarm device. Fig. XXIII is an inner side view of the line-spacer, showing the position of the cylinder ratchet-teeth by short radial lines. Fig. XXIV is a detail plan view of the revolving device, and Fig. XXV is a rear side view of the same. Fig. XXVI is a perspective view of a split washer-spring. Fig. XXVII is a broken detail view showing the convex bearing to which the pressure roller-hangers are secured. Fig. XXVIII is an enlarged vertical section of the paper-guide shown in Fig. III. Fig. XXIX is a view looking upon top of the same paper-guide. Fig. XXX is a horizontal section of the square screw, showing the nut thereon, also shown in Figs. III and XVIII.

20 represents the frame of the machine, provided with a key-board consisting of a series of removable steps 21, which are of thin metal, through which the stems 22 of the keys 23 play up and down freely. The finger piece or button of the key is dish-shaped in its under side to receive the head 24 of the stem 22. Lugs 25 project within the circle of the said dish, and wings 26 of the head 24 are adapted to pass in between the said lugs, each wing being chisel-edged on its radial edge in one direction, so that when the button is placed upon the head of the stem and forcibly turned toward the lugs the said edges of the wings are driven bodily into and beneath the lugs, their wedging form being such as to hug the head permanently into the bottom of the dish. These buttons may properly be made of hard rubber, so that the heads thus forced in may be removed by applying a little force to turn them backward and be replaced any number of times that may be required, always holding tightly when the button is set so as to bring the letter thereon in its proper upright position.

27 represents the draw-bars; 28, the rear braces; 29, the forward braces, upon which the draw-bars are pivotally hung, so that throughout their movement the draw-bars remain parallel to their initial position, as claimed in a former application. Braces 29 are crank-rockers, each being provided with a downward arm 30, to which the lower end of the key-stem is pivoted at 31. This pivot is preferably made as a stud projecting at the side of the arm 30, and the said arm is formed with a hook-shaped offset 32, whose hook end rises outside of the lower end of the stem to keep the same in place upon the stud when inserted; but the hook end is not long enough to reach up to the stud 31, so that when the step-pieces 21 are removed a stem 22 may be swung either forward or backward to a nearly horizontal position, as shown in dotted lines 33, Fig. V, and be taken off the stud over the end of the hook, the end of each stem being elongated more than the side thickness of the stem from the pivot-hole enough to be held in place by the hook when in a vertical position of service, thus rendering all the key-stems readily removable from their hangings without the necessity of any movable pins or screws.

The draw-bars 27 are stalled between the teeth of a comb-shaped guide 34, which is rigidly fixed to the frame above the plane of the bars to keep the bars from frictional contact with each other, and the respective key-stems 22 are offset to one side each enough to reach its own rod-brace in groups of eight corresponding with each column of eight keys, except four columns at the middle of key-board whose position is occupied by the spacer-key 35. The arm of the spacer-key has a broad T-shaped head, whose ends are pivoted at 36 to ears 37, projecting forward from the comb.

38 is a rod connecting the spacer-key with the arm 30 of one of the braces 29, whose draw-bar 27 is not connected with any type, but operates the spacing mechanism as each type-key does. As a distinguishing feature, the spacing-key extends crosswise of the machine, occupying the space of four letter-keys, in order that it may be quickly struck by the operator, and its broad T-headed arm having bearings far apart resists any sidewise twist consequent to striking the spacing-key on either end, so that the spacer-key operates with the least possible friction whether it be struck on either end or midway. The draw-bar is made of inverted-U shape, and the pivots 39, on which the braces are hung, are each made as a shoulder-stud, riveted firmly to one side of the U and passing the full size of the body through the other side, so that the two sides of the U may be wedged or strained apart to permit the brace to be inserted past the outer end of the stud onto the stud as a bearing, and then the U thus opened may be again closed by pressure, so as to support both ends of the stud. By this means the pivot or stud can never be lost, and on account of its being riveted to only one side of the trough there is no tendency to press the trough together in the act of heading the rivet and cause friction upon the sides of the brace, as was likely to be the case with the old-style rivets headed at both ends against the sides of the U-shaped bar. This same idea of riveting only to one side may be carried out to advantage in other similar cases of braces or removable parts secured within troughs of flexible material, which may be spread open and again closed.

40 is the type-arm, which is forged out of solid stock and slotted longitudinally in its upper side to receive the hanger-block 41, upon which it is pivoted at 42. The block being nearly one-half as long as the type-arm and firmly fixed to the top plate 43 by means of a binding-screw 44, passing into the said block through a radial slot in the plate, permits the type-arm to be swung sidewise to adjust the location of the type in one direction and to be slid a little endwise to adjust the location of the type in the other direction, and then firmly fixes the same by means of the one single binding-screw and that in a convenient position to be reached, so that any person may easily align the type at any time, and when once so aligned it is almost impossible that they should be thrown out of line, except by some such serious strain as will permanently bend the type-arm.

45 represents the connecting-rod between the type-arm and the draw-bar 27. This rod is screwed at its upper end into a head 46 for the purpose of adjusting the length of the rod, the head being pivoted to the type-arm and the lower end of the rod being connected with the draw-bar by means of a stirrup 47, to which it is connected by means of a bent arm 48, passing as a lateral pivot through the said stirrup.

49 is a sleeve fitted to slide upon the connecting-rod, and having a downward-extending arm with an indentation or perforation at its lower end to spring over the conical point of the pivotal arm 48 to prevent said pivot from being shaken out of the stirrup while in service, and yet to permit by being readily slipped upward of the said pivot being withdrawn from the stirrup so that the rod may be turned for the purpose of screwing it into or out of its head or bearing to adjust its length.

51 represents the carriage, provided with V-shaped ribs 52 along its side edges to engage two pairs of grooved rollers 53, which are mounted on independent shafts 54, each shaft having two other rollers 55, journaled one above and the other below the roller 53. This shaft may be fixed in any one of the rollers, but the other two must revolve on the shaft, so that either one of the rollers may revolve independently of the other, or the shaft may be headed to keep it in place and all three rollers be free to revolve on it.

56 represents the carriage-rails fixed permanently to the top of the frame and provided with parallel grooves to receive the V-shaped edges of the rollers 55. All of these rollers have rolling bearings only at one edge of each.

The rollers 53 bear and roll against the edges of the carriage, but do not touch the side rail 56, while the rollers 55 bear and roll against the said rail, but do not touch the carriage. Thus it is evident that if the rollers 55 were to become stopped—as, for example, by the end stops 57—the carriage might still continue to run freely on the rollers 53; or if, on the contrary, the rollers 53 were to come in contact with stops 58 or 59, which are both fixed to the carriage, the carriage might still continue to travel by the rollers 56 running as freely as ever upon the rails. The rollers 55 are nearly twice as large as the rollers 53, so that the spaces between the stops 58 and 59 on the carriage need to be only about half as much each as the whole travel of the carriage, thus always maintaining rollers at both ends of the carriage without the necessity of having the rail any longer than the frame. If it should chance that any one of the rollers reaches an end stop and the carriage continues to roll upon the other roller on the same shaft, this shaft of rollers will be started back by the return movement of the carriage the same as if there were no such stop there. Otherwise one of the stops 58 or 59 will engage the roller 53 and move the shaft bodily along upon the rollers 55, so that whatever position the rollers may chance to be in the carriage will move upon them without friction, and it is impossible that any roller should become locked so as to actually interrupt or to cause friction to the carriage.

60 represents the spring-wheel for drawing the carriage forward by means of the connecting-chain 61.

62 is a toothed disk, provided with a hub or sleeve 63, journaled in a bearing 64 of the frame 20 and provided with another hub 65, upon which the spring 66 winds. This spring is connected at one end with the spring-wheel 60 and at the other end with the disk 62, the latter being fixed, while the former is caused to revolve in one direction relatively thereto by the chain being drawn off from the wheel in returning the carriage and in the other direction by the action of the spring in drawing the carriage forward.

67 is a spur-wheel journaled in the frame to engage the teeth of the disk 62 and provided with a knob 68, whereby it may be revolved by a thumb and finger of the operator to tighten or loosen the tension of the spring at any time, and 69 is a washer split at one edge and set out of its natural plane to serve as a spring between the knob and the frame, whereby sufficient tension is given to the disk 62 to prevent its being revolved either way by the tension of the carriage-spring 66, and yet permitting the knob to be readily turned either way when sufficient force is applied to it to turn the pinion.

70 is a heart-shaped cam mounted on the same shaft with the spring-wheel 60, and prevented from revolving in one direction by means of a ratchet-wheel 71, fixed on the face of the cam, and a detent 72, hung to the main frame and adapted to engage the teeth of the said ratchet.

73 is a spring-pawl, pivoted either to the spring-wheel 60 or to the cam 70 to engage a ratchet-wheel 74, which is fixed to the other of the two, whereby the rotation of the wheel as the carriage advances in the direction of the work, either step by step or being suddenly drawn forward, causes the cam to be revolved constantly in one direction, said cam being prevented from revolving in the other direction by the ratchet-wheel 71 and the detent 72.

75 is a split washer spring acting between a head 76 on the shaft of the spring-wheel and the cam, giving sufficient tension to prevent the cam being thrown ahead by a sudden movement of the carriage.

77 represents the ribbon-spool carriers, rigidly fixed upon the shaft 78, which is journaled to the rock in the main frame and is provided with a roller 79 to engage the periphery of the cam 70.

80 is a spring acting against the opposite side of the spool-carrier to hold its roller 79 in engagement with the cam.

81 is a ratchet-wheel, fixed upon the spool-shaft 82, and 83 is a pawl pivoted to a brace-arm 84, to engage the said ratchet-wheel. There are two braces 84, one to each spool, fixed rigidly upon a shaft 85, which is journaled to rock in the frame in the direction of the spool-carrier's cross movement.

86 represents a pair of ears projecting from the brace 84 at each side of the ratchet-wheel 81, between which ears the pawl 83 is pivoted, so that the brace may be carried across with the spool-frame, and as the brace-shaft is at some distance from the spool-frame shaft every step of advance of the spool-frame causes the pawl 83 to rotate the ratchet-wheel 81 a little, thus gradually winding the ribbon upon the spool; but when the spool-carrier recedes toward the cam the pawl 83 drags upon the ratchet, and a spring-washer 91 on the spool-shaft has sufficient tension to prevent back action of the spool. Thus every stroke of the type, by releasing the carriage to be fed a step by the spring-wheel, causes the cam to move the ribbon crosswise and the brace-feed advances the ribbon lengthwise a little at each forward movement of the spool-carrier, thus feeding the ribbon diagonally; but at each return of the spool-carrier the ribbon is not advanced, so that the type-path upon the ribbon is first a diagonal advance, then a return square across partly over the same path, then another diagonal, close to the edge of the first one, then another return square across, close to the edge of the preceding one, and the ribbon is twice traveled over in every spot alike at one winding, then on being rewound onto the first spool the same action is repeated; but the diagonals are across the first ones and it is impossible for the ribbon to be struck on the same spot by two successive type-blows unless the carriage is forcibly stopped, and as returning the carriage between lines does not move the ribbon and as it cannot in any case be moved backward by the machine the whole surface of the ribbon must do service and wear out equally.

The brace-arms 84 at the opposite ends of the rock-shaft 85 face in opposite directions, and the said shaft is adapted to be slid endwise in its bearings to bring either one or the other of the said arms into action, according as it is desirable to feed the ribbon to the right or to the left along the machine.

89 represents a spring adapted to engage either one of two grooves in the rock-shaft 85, and having sufficient tension to maintain the shaft in either of its endwise positions.

90 represents a stop-pin or shoulder on the pawl 83 to prevent the same from being thrown forward out of place by the spring 87 when the said pawl is not in engagement with its ratchet-wheel.

92 represents a wooden spool, which it is intended to place upon the market with an ink-ribbon 93 wound thereon. The spool-shaft 82 at the right hand of the machine is journaled in one arm 94 of the spool-carrier, and is kept in place therein by means of flanges or shoulders 95.

96 is a portion of the shaft screw-threaded into the portion 82, its head 97 being adapted to bind against the spool to force it to revolve therewith, and being further fitted as a journal in the bearing 98 of the spool-carrier.

When the ribbon becomes worn out, it is only necessary to unscrew the portion 96 of the shaft, detach the end of the ribbon from the opposite spool and replace it with a new spool of ribbon, and attach the end of the new ribbon to the opposite or left-hand spool, which remains on the machine. By this means all the dirty work of winding new ribbons on machine-spools, and the consequent waste of the ribbon-ink thereby, is avoided, because the ribbon may be used upon the machine in the act of its first unwinding from the merchantable spool, the ribbon being wound back and forth too and from the wooden spool until it is worn out.

99 represents the cylinder, which holds the paper to receive the stroke of the type, mounted to revolve freely upon a shaft 100, which is fixed in the cylinder-frame, the latter comprising the end beams 101 and longitudinal rods 102 and 103. This frame is journaled by means of trunnions 104 in open Y-bearings 105 of the carriage 51, and the ends of the journal-shaft 100 are adapted to rest also in open Y-bearings 106 when the cylinder is in position for service. One side 107 of the bearings 106 is a segment of a circle concentric with the bearing 105 and tangent to the upper side of the bearing 106.

108 is a hand-lever projecting from the left-hand beam 101, whereby the cylinder-frame may be raised to bring the line which is being printed up in sight above the scale 109.

110 is a segmental hook pivoted at 111 in the carriage, its rear end (shown by dotted lines 112) being constantly pressed downward by a spiral spring 113, whose tension may be increased or diminished by a tension-screw 114, whereby the segmental hook 110 is pressed continually toward the opposite segment 107. This hook is provided with a notch 115, forming a shoulder, by which the shaft 100 is held with sufficient force by spring 113 acting on the hook-lever to be kept in place while in service.

116 is another notch, forming a hook at the upper end of the segment 110 to prevent the cylinder being thrown entirely out of its bearings 105 when raised for inspecting the work. By pressing the hook 110 forward out of the path of the shaft 100 the cylinder may be tilted a little farther back and be raised with its frame bodily out of the machine, and other cylinders either harder or softer may be provided with frames fitted to be mounted interchangeably in the same bearings.

The horn 117 of the bearing 105, adjacent to the segment 107, projects above a radial line coinciding with the top of the segment 107 to prevent the trunnions 104 from being thrown upward out of their bearings by any sudden movement until the shaft 100 is properly released and raised above the segment 107. The rear horn 118 of bearing 105 is extended backward and upward in order to provide a wide open mouth to readily guide the trunnions into place when inserting the cylinder. The shaft 100 is rigidly fixed to and forms a part of the cylinder-frame. The hand-lever 108 is a rigid portion of the cylinder-frame, and, lifting upon it, raises the cylinder upon the trunnion-bearings 104, but has no tendency to revolve the cylinder upon its shaft 100. The hook 116 is located in a certain fixed relation to the trunnions 104, the upper edge of the scale 109, and that line upon the cylinder on which the type strike, so that when the shaft 100 is raised into engagement with the said hook the said line of the paper is brought exactly to the upper edge of the scale, whereby the paper may be adjusted to its proper alignment, and a pointer 119, fixed to the front rail and located just above the scale, points both at the spot upon the paper where the next type will strike and at the line upon the scale indicating the position of that spot relative to the width of the paper. As the carriage passes too and fro, the pointer always indicates the exact position of each type-impression next to be made, so that the marginal lines may be arranged relative thereto regardless of the scale, and as the carriage passes along at work the paper constantly in sight relative to this pointer shows when the end of a line is approaching. The pointer also indicates the exact point at which to insert a letter, regardless of the scale, the only actual service of which is in properly averaging the location of headings, parts of lines, &c.

120 represents the apron for guiding the paper against the cylinder, and 121 shows two extensions of the apron beneath the cylinder for the same purpose.

122 is a stiff plate forming the backbone of the apron and extending beyond its ends to be attached to bearings 123 on the end beams 101 of the cylinder-frame. These bearings are convex curves; but the ends of the backbone are flat and provided with binding-screws 124 at each edge, whereby the backbone may be rocked upon the convex bearings to swing the edge of the apron to or from the cylinder and to fix it at the exact adjustment required relatively thereto, so that the paper may be guided properly against the cylinder, but will not be pinched thereon by the apron, as would be the case if the apron were held toward the cylinder by a spring.

125 is the pressure-roller journaled in arms 126, which are fixed to a rock-shaft 102, that is journaled in the end beams 101, and provided with a thumb-lever 128 and a spring 129, which, pressing upward upon the thumb-lever presses the roller forward against the cylinder or against one or more interposed sheets of paper to hold them upon the cylinder, and yet in no way resisting the free rotation of the cylinder and paper. The thumb-lever 128 enables the roller to be pressed away from the cylinder at any time desired.

130 represents a common paper-guide attached to the front rod 103 of the cylinder-frame.

131 is a paper-guide peculiar to this machine fixed to the front rail or other fixture of the carriage adjacent to the lower forward quadrant of the cylinder and of segmental form, as shown in Fig. XXVI, for guiding the edge of the paper parallel with the cylinder when inserted across the space between the front edge of the apron and the common guide 130. In order to do this the cylinder should be raised just a little by means of the hand-lever 108 while the paper is being inserted, thus bringing the edge of the apron to the lower end of guide 131, which guide, being located as near the edge of the cylinder as the guide 130 is, is slotted vertically midway, as shown in Fig. XXIX, to permit the said guide 130 to pass in between its two sides when the cylinder is returned downward to its normal position. This guide 131 insures the passage of narrow paper, cards, envelopes, &c., to their proper position beneath guide 130.

132 represents the feed-rack firmly fixed to the carriage with its teeth downward.

133 is a detent pivoted to a bracket 134, fixed to the rail 56 or other fixture of the frame. This detent is pressed normally into engagement with the rack by a spring 135 to hold the carriage still while not in service.

136 is a shaft journaled to oscillate upon a pin fixed in the same bracket and provided with an arm 137, which is connected by means of a rod 138 with the spacing-lever 139, which is provided with a bar extending beneath and against the rear braces 28 of all the key draw-bars.

141 is a spring connected with the arm 137 and provided with a tension-screw 142 and an adjusting-nut 143, whereby the tension upon the keys and spacer may be regulated independently of the balancing-spring which lifts each draw-bar. The screw 142 is squared enough to engage a square hole in the hanger 144 to prevent the screw being turned by the nut.

145 is a wiper or cam extending to the right from the sleeve 136 to engage an arm 146 of the detent 133.

147 is another detent hung upon the same pivot 148 as the detent 133, with its edge slightly ahead of the edge of detent 133 in the direction of the advancing carriage.

149 is a cam extending to the left from the sleeve 136 and shaped so as to bear constantly between two arms 150 of the detent 147. At every movement of the key or spacing lever the rod 138 raises the arm 137 and rocks the sleeve, disengaging the detent 133, and at the same time engaging the detent 147 with the same tooth of the rack, so that the stroke of the type takes place when the rack is held still by detent 147, and when the key is released the spring 135 restores the sleeve and detent 147 to their normal positions, while detent 133 is permitted to be sprung up into engagement with the next tooth. Thus the carriage when at rest is always in position to receive the next type-stroke, as indicated by the fixed pointer.

The detents 133 and 147 being hung by long arms upon pivots in the line of the carriage-feed and close up to the rack, their motion into and out of the teeth is so direct that the carriage need not be pushed even a half-tooth space beyond the desired point in order to be engaged and retained at that point. This is a matter of great convenience in locating corrections, &c.

151 is a latch pivoted at 153 in the bracket 134 and held constantly upward by means of a spring 152, with its end in the path of a lug 154, which is fixed to slide upon a rib 155, that is secured to the rear side of the feed-rack and held a little distance therefrom by means of stud-screws 156. The lug has a downward projection 157 forwardly inclined and having an abrupt shoulder on its rear side to engage latch 151 when the carriage is moved back, thus stopping the carriage at the margin of the paper. This marginal line is located by fixing the lug in a position corresponding to any desired letter-space by means of a set-screw 158, having a conical point adapted to engage any one of a series of holes 159 in the rear face of the rib 155, these holes being exact letter-spaces apart.

160 is a shifter-bar having its smooth lower edge a very little below the face of the rack-teeth to slide upon the latch 151 to prevent it from touching the rack-teeth. This bar is perforated with diagonal slots 161, by means of which it is mounted upon the stud-screws 156 between the rib 155 and the rack.

162 is a spring acting upon the shifter-bar to press it upward in the direction parallel with its slots and away from the detents.

163 is a lever pivoted to the carriage at 164 and resting its rear end upon the shifter-bar 160, and provided at its forward end with a finger-piece 165, opposed by a thumb-piece 166, which is fixed to the carriage, so that the operator by taking these pieces between his thumb and finger and pressing them together bears the shifter-bar 160 downward upon the detent 133 and the latch 151, moving the former out of engagement with the rack and the latter out of the path of the marginal stop-lug, so that the carriage is set free to be moved either backward or forward any required distance by the very act of taking hold of these latches by which the carriage is moved. The latch 151 has an upward-inclined offset 167 to engage the shifter-bar 160, while its main top 168 is low enough to pass under the body of the lug 154 into the path of the downward projection 157.

169 is the bell, and 170 its hammer, pivoted at 171 to the rail and provided with a latch 172, which is pivoted to the forward end of the hammer-lever and provided with a rearward projecting leaf 173, slanting toward the pivot 171 in the path of a pin 174, which projects inward from the alarm-lug 175, and the latter is fitted to slide upon the rib 155 and provided with a pointed set-screw 176, adapted to engage the holes 159, whereby this lug may be set to sound the alarm-bell at any point in the movement of the carriage. As the carriage passes forward, the alarm-pin 174, pressing forward upon the upper side of the leaf 173, presses that end of the hammer-lever downward and raises the hammer until the pin passes over the said leaf, when the hammer is released, and, dropping against the bell, sounds the alarm.

When the carriage is moved backward, the alarm-pin 174 passes beneath the leaf 173, which, being free to rise upward on its pivotal attachment to the hammer-lever, is lifted out of the path by the pin, permitting the latter to pass without affecting the bell-hammer.

177 is a shoulder formed in the alarm-lug 175 to engage an arm 178 on sleeve 136, which prevents the sleeve-arm 137 being raised, and thereby prevents any key, including the spacing-lever, from being operated. Thus the alarm-lug acts as a positive stop to the machine, so that it is impossible for the operator to strike a number of letters upon the same space at the end of a line, and as the keys cannot be operated at all the operator is notified that the end of the line is reached. The relation of the parts of the alarm and stopping device is such that the alarm is always sounded five spaces before the end of a line is reached.

179 represents a ratchet-wheel of radial teeth secured to the end of the cylinder and engaged by a spring-detent 180, which is secured to the cylinder-frame, and has a point so wedge-shaped as to retain the cylinder in position by friction upon the teeth while bearing between them, and yet it does not prevent the cylinder from being rolled either forward or backward by the operator's fingers pressing anywhere upon the surface of the cylinder.

181 is the line-spacing lever, consisting of a hand-lever pivoted to the carriage at 182.

183 is a pawl pivoted at its lower end to the spacing-lever and adapted to engage its point with the cylinder-teeth 179 whenever the hand-lever is raised, the pawl being so balanced on its pivot as to swing naturally toward the said teeth, but being held disengaged from the teeth when the spacing-lever is down by its lower end or chin resting upon a fixed shelf 184, as shown in Fig. XXV in full lines, its position in service being shown in dotted lines.

185 is an arm projecting from the pawl to engage stops 186 187 upon the stop-lug, which is pivoted to the carriage at 188 and provided with an arm 189, whereby the stop-lug may be turned upon its pivot to bring either the stop 187 or 186 into the path of the pawl-arm 185, and the pawl is stopped in its movement, so as to revolve the cylinder either one tooth or two teeth at a time, the spaces between the teeth corresponding to the line-spaces of the ratchet. When the arm 185 engages either lug, the point of the pawl, being upon the same side of the center as the said arm, is very firmly pressed into the notch between the teeth, so that it is impossible to throw the cylinder ahead of the pawl so as to revolve the cylinder more tooth-spaces than the stop-lug is set for. The instant the spacing-lever is dropped by the operator the pawl drags backward over the teeth in the usual manner; but when its chin comes in contact with shelf 184 the point is thrown out of engagement and held entirely free from the ratchet-wheel, so that whenever the operator desires to revolve the cylinder either way he may take hold of the cylinder at any point and revolve it, or he may press his finger upon the paper, holding that down upon the cylinder, and thereby revolve the cylinder without previously touching or releasing any detent or other device. The shelf 184 is herein shown as projecting from the arm 189; but it might as well be a solid lug cast upon the carriage.

190 represents the type-cleaning brush, pivoted at 191 to a removable frame 192, which comprises the disk 193, provided with a shoulder journaled to fit a circular bearing in the top plate 43 of the machine, a depending arm 194, and a crank-arm 195. The knob 196 is circular and corrugated or ruffled on its lower face and fitted to revolve upon the crank-wrist.

197 is a lever pivoted at 198 to the crank and connected by means of a rod 199 with the brush at a little distance from the pivot thereof. The brush hangs at the height to engage the faces of all the types when they are hanging down at rest, the brush being revolved by turning the crank.

The only engagement with the under side of the plate 43 is by means of the offset or shoulder 200, so that the crank may be lowered or raised a little while being revolved to press the brush more or less firmly against the faces of the type, all parts of the brush-frame being stiff enough to retain their position in service; but the bristles of the brush are of course sufficiently yielding to adapt themselves to the faces of the type, and whether the brush be revolved one way or the other the bristles at the pivot end will drag directly across the faces of the type, while the other end of the brush being kept constantly vibrating or reciprocating up and down by means of the ruffled knob held firmly in the hand while the crank revolves the bristles along the body of the brush will drag across the type at constantly-varying upward and downward angles, so that the spaces within the letters are quickly cleaned. This brush can only be used with a machine having a top plate corresponding to the plate 43, projecting inward and beyond the type-hangers and formed as a circular bearing for the disk 193 to revolve in; but it is possible that a removable bearing-plate might be adapted to other machines, so that this brush might be used therewith. Some of the advantages of this brush would be attained if the brush were hung stiffly to its frame and the vibrating mechanism dispensed with, though we prefer the complete device, as hereinbefore described, because its operation is quicker and more effective than a non-vibrating brush could be.

Having thus fully described our invention, what we believe to be new, and desire to secure by Letters Patent, is the following:

1. The combination of a type-writer key-button dish-shaped in its under side and having solid lugs of penetrable material projecting within the circle of the dish, and a key-stem head of thin metal having wings shaped to enter the said dish between the lugs and chisel-edged on their radial edges, substantially as described, whereby the said wings may be forcibly turned into the said solid lugs to secure the knob removably upon the stem-head.

2. The combination of a dish-shaped key-button having solid lugs of penetrable material projecting within the circle of the dish and a stem-head having wings to engage the said dish and lugs, the wings having sharp wedge-shaped radial edges adapted to penetrate the said lugs, whereby the head will be forced firmly to the bottom of the dish, as described.

3. The combination of a long spacing-key secured midway upon an arm having a T-shaped head and connected at its lower end with mechanism whereby the spacing device is operated, the cross of the T being in the same direction as the length of the key, and bearings having fixed connection with the machine-frame and pivotally connected with the arms of the said T-shaped head, substantially as described.

4. The combination of a connecting-rod screw-threaded at one end and bent and pointed at the other end to form a pivot, and a sleeve fitted to slide upon the said rod and having a spring-arm indented or perforated to engage the said pivot, substantially as described.

5. The combination of a connecting-rod adapted at one end to revolve in its bearing and provided with a lateral pivot at the other end, and a sleeve fitted to slide upon said rod and having an arm to extend over the end of said pivot, substantially as described.

6. The combination of a carriage having V-shaped parallel edges, a pair of fixed rails having each one or more grooves, and three or more sets of rollers, each set comprising three rollers journaled to revolve independently of each other upon a traveling shaft, the middle roller of each set adapted to roll upon the edge of the carriage without touching the rail, and the end rollers of each set adapted to roll upon the rail without touching the carriage, substantially as described.

7. The combination of a carriage having a rollway on each of its parallel edges, rollers to fit the said rollways, a pair of rails located at the sides of the carriage and having rollways on the edges adjacent to and parallel with the carriage-rollways, and rollers fitted to the rollways of the rail and mounted upon the same journals as the first-named rollers in groups of three therewith, each roller being free to revolve independently of the others and each roller fitted to roll upon one of the opposite members, the carriage or a rail, without touching the other member, substantially as described.

8. The combination of a carriage having rollways, rollers shaped to fit the said ways, side rails having rollways, rollers shaped to fit said rollways and mounted upon the same shafts as the first-named rollers—three rollers upon each shaft—a stop at the end of each rail in the path of the rollers, and pairs of stops located on the edges of the carriage in the path of the rollers which fit the same, the rollers which engage the carriage being smaller than the rollers which engage the rails and the pairs of stops being located much nearer together upon the carriage than upon the rails, whereby the rollers will be prevented from all gathering at one end of the machine, and whereby any roller will be returned to its proper path whenever it chances to meet an end stop.

9. The combination of a carriage shaped as a rollway at its edge, a rail beside the carriage and shaped as a rollway at its adjacent edge, and three rollers mounted independently of each other upon the same shaft, two of the said rollers fitted to roll upon one of the said rollways and not touch the other, and the third roller fitted to roll upon the said other without touching the first, substantially as described.

10. The combination of a toothed disk mounted on a journal, a wheel mounted on the same journal beside the disk and adapted to wind up a carriage-feeding chain, a winding-spring attached at one end to the said wheel and at the other end to the disk, and a pinion journaled in a fixture of the frame to engage the teeth of the said disk and provided with a handle, whereby it may be actuated to wind or unwind the said spring at any time without interrupting the service of the feeding-wheel or revolving the said journal.

11. The combination of a carriage-feeding wheel and a toothed disk mounted upon the same shaft, a feeding-spring attached to the wheel and disk, a pinion journaled to engage the disk teeth, and a tension-spring acting between the pinion and a fixture of the frame, whereby the pinion may resist the strain of the carriage-feeding spring, as described.

12. The combination of a carriage chain-wheel, a heart-shaped cam mounted freely upon the wheel-shaft and having a ratchet-wheel fixed to its outer face, a detent hung to the frame to engage the said ratchet-wheel, a pawl-and-ratchet-wheel connection between the chain-wheel and the cam, and connections between the cam and spool-frame, whereby the latter is moved crosswise of the line of the ribbon.

13. The combination of a pair of ribbon-spool carriers rigidly fixed upon a shaft journaled to rock in the frame, a heart-shaped cam mounted freely on a shaft, a roller upon one side of the spool-carrier to engage the cam, and a spring acting against the opposite side of the carrier pressing it to engage the cam, and means, substantially as described, for revolving the cam in one direction only.

14. The combination of a spool-carrier mounted for transverse movement and provided with a ratchet-wheel on its shaft, a brace fixed to a shaft journaled in the frame to rock in the direction of the spool's cross movement, a pawl hung on the brace to engage the ratchet-wheel, and ears of the brace extending at both sides of the ratchet-wheel, whereby the brace and pawl are caused to move in unison with the spool-carrier.

15. The combination of a spool-carrier mounted for transverse movement and provided with a ratchet-wheel on its shaft, a brace fixed to a shaft journaled in the frame to rock in the direction of the spool's cross movement, a pawl hung on the brace to engage the ratchet-wheel, and ears of the brace extending both sides of the ratchet-wheel beyond the end of the pawl, whereby the brace will continue in engagement with the ratchet-wheel when its body is drawn far enough away to disengage the pawl.

16. The combination of a spool having a ratchet-wheel upon its shaft, a brace, and a pawl hung thereon to engage the said wheel, the brace adapted to be moved, carrying the pawl out of engagement, and a pin or shoulder upon the pawl limiting its forward movement when disengaged, substantially as described.

17. The combination of two ribbon-spools at the opposite ends of a machine and provided with ratchet-wheels whose teeth face in opposite directions, a pair of braces fixed upon a rock-shaft journaled to rock and to slide endwise in the frame and carrying pawls to engage the said ratchet-wheels, respectively, and means, substantially as described, for retaining the rock-shaft and its appendages in either of its endwise positions.

18. The combination of a spool frame or carrier having two journal-bearings, a separable shaft having one of its parts journaled irremovably in one of the said bearings, the other part having a body adapted to pass through a spool, and a head to bind the spool, the said head being fitted as a journal in the other of the carrier-bearings, substantially as described.

19. The combination of a type-writer impression-cylinder journaled upon a shaft, a frame comprising end beams and longitudinal rods, in which frame the cylinder-shaft is fixed to project beyond the beams, the said frame being provided with trunnions above and to the rear of the cylinder-shaft, and open Y-shaped bearings fixed rigidly to or integral with the carriage to receive the said shaft and trunnions, substantially as described.

20. The combination of a type-writer-carriage having two fixed bearings at each end, and a cylinder-carriage having a shaft and a trunnion projecting at each end to removably engage the said fixed bearings, substantially as described.

21. The combination of a carriage having an open Y-shaped bearing at each end, also having a second bearing below each of the first-named bearings, one side of each second bearing being formed as a segment of a circle concentric with the first-named bearings and rising somewhat above said first bearings, and a cylinder-frame having shafts or trunnions to engage the said bearings, substantially as described.

22. The combination of a carriage formed with a pair of Y-shaped bearings, and with a second pair of bearings having a segmental side concentric with the first, and a segmental hook pivoted to the carriage and having a notch forming a shoulder adjacent to one of the second bearings and a spring acting upon the said hook, whereby a cylinder-carriage having two pairs of trunnions or shafts may be removably supported, substantially as described.

23. The combination of a carriage having two pairs of open bearings, a cylinder-frame having shafts or trunnions to fit removably therein, and a hook of segmental form pivoted to the carriage, the upper end of the hook being adapted to prevent the removal of the cylinder-frame, substantially as described.

24. The combination of a carriage having two pairs of open bearings, a cylinder-frame provided with trunnions or shafts to fit therein, a segmental hook having a lever-arm pivoted to the carriage, a spring to engage the said arm, and a tension-screw for said spring, substantially as described.

25. The combination of a carriage having one pair of open bearings and a second pair of bearings with a segmental side concentric with the first, and a cylinder-frame having trunnions or shafts to engage the said bearings, that horn of each of the first-named bearings adjacent to the said segment projecting above a radial line which coincides with the top of the segment, substantially as described.

26. The combination of a cylinder-frame having end beams provided with curved convex bearing-surfaces and an apron having arms plane upon one side to engage the said surfaces, and binding-screws at each edge of said arms, whereby they may be rocked upon and fixed to the bearings, substantially as described.

27. The combination of a cylinder-frame and an apron, the bearings between the apron and frame having one curved side, and binding-screws whereby the apron may be rocked upon the bearings and adjustably fixed thereto, substantially as described.

28. The combination of a cylinder journaled in a frame, a rock-shaft journaled in the same frame and provided with arms, one of which extends forward as a thumb-lever, a pressure-roller journaled in the said arms, and a spring acting on the thumb-lever to press the roller upon the cylinder independent of the apron, substantially as described.

29. The combination of a cylinder-frame adapted to be turned up for inspecting its under side or paper thereon, and a paper-guide fixed to the frame adjacent to the lower forward quadrant of the cylinder and of segmental form nearly parallel with the cylinder when in service, substantially as described.

30. The combination of a cylinder-frame adapted to be turned up for inspection, a paper-guide fixed on the cylinder-frame, and another paper-guide fixed to the machine-frame adjacent to the lower forward quadrant of the cylinder and slotted midway as a passage-way for the first-named guide, substantially as described.

31. A carriage-escapement comprising a rack upon the carriage with downward-facing teeth, two detents, one a little ahead of the other, pivoted to the frame and lying in the direction of and close up to the rack, and provided with rearward arms, a spring impelling the rear detent into engagement with the rack, a shaft journaled in a fixture of the frame and provided with a forward-projecting arm adapted to engage in arm of the spring-detent, and further provided with a rearward-projecting wiper or cam to engage the forward detent, and means for rocking the shaft at each stroke of a spacer or type, whereby the spring-detent will be released and the forward detent be pushed up to engage the same tooth, and upon releasing the spacer-type key the forward detent is withdrawn from engagement and the rear detent is permitted to spring into engagement with the next tooth, substantially as described.

32. The combination of a feed-rack, two detents pivoted to engage the same, one ahead of the other, and a shaft having cams to engage the two detents, also having an arm engaged by an adjustable spring and connected with the spacing-keys, substantially as described.

33. The combination of an escapement-shaft provided with cams and an arm, a spring attached at one end to said arm, a square or flat-sided screw passing freely through a similarly-shaped hole in a hanger and connected with the other end of the spring, and a nut upon the screw, substantially as described.

34. The combination of a carriage, a rib fixed thereto and having holes in it corresponding with letter-spaces, a lug fitted to slide upon the rib and provided with a screw to engage any one of the said holes and having a downward projection with an abrupt rear shoulder and a forward incline, a latch pivoted to a bracket, and a spring impelling it into the path of the said lug, substantially as described.

35. The combination of a carriage having a feed-rack, a detent impelled continually to engage said rack, a shifter-bar having a smooth edge adjacent to the detent and perforated with diagonal slots adapted to engage screws or studs in the carriage, a spring impelling the shifter-bar away from the detent, and a finger-lever pivoted to the carriage to engage the shifter-bar, substantially as described.

36. The combination of a carriage, a marginal stop-lug attached adjustably to the carriage, a latch pivoted to a bracket to engage the said lug, a diagonally-slotted bar attached to the carriage by means of screws in said slots, a lifting-spring for the shifter-bar, and a finger-lever adapted to engage the said bar, substantially as described.

37. The combination of a carriage having a feed-rack, a stop-lug adjustably fixed to the carriage, a spring-latch pivoted to a bracket and having one portion of its free end normally in the path of the said lug and another portion in line of said detent, a shifter-bar hung to engage both the latch and detent, and means for operating the same, substantially as described, whereby the thumb and finger of the operator in grasping the carriage at the point to slide it to and fro will set the carriage free by the same act.

38. The combination of a pair of fixed pins or studs, a shifter-bar having diagonal slots to engage the same, whereby its ends will be guided to rise and fall together from force applied at but one end, means for operating the bar, and a detent or latch to be disengaged thereby, substantially as described.

39. A type-writer shifter-bar having diagonal slideways near its ends and connections between it and the detent, substantially as described.

40. The combination of a feed-detent-operating rock-shaft having a projecting arm adapted to move at each step of the carriage-feed and a lug adjustably attached to the carriage and having a portion fitted to engage the said rock-shaft arm and stop its movement, substantially as described.

41. The combination of a toothed feed-rack, a spring-detent normally engaging the rack, a device adapted to be moved to disengage said detent from the rack by each stroke of a key, and a lug adjustably fixed to the attachment of the carriage to travel therewith into the path of the said moving device, substantially as described, whereby the movement of the disengaging device will be interrupted to stop the machine at a prearranged point.

42. The combination of a toothed feed-rack, a spring-detent normally engaging the same, a device adapted to communicate motion from the keys to disengage the said detent from the rack, an alarm-bell, and a lug adjustably attached to a portion of the carriage and adapted to trip the alarm device and afterward to interrupt the action of the said communicating device, substantially as described, whereby the alarm will be sounded at a fixed number of spaces before the machine is stopped.

43. The combination of a paper-carrying cylinder having a ratchet-wheel attached to one end, a spring-detent to engage the teeth of the wheel, a line-spacing lever pivoted to the carriage, a pawl pivoted to the lever with its weight on the side of the pivot to tip it into engagement with the said ratchet, a chin upon the pawl at its weighted side, and a shelf fixed at the rear end of the path of the pawl to engage the said chin, whereby the pawl is normally held wholly disengaged from the ratchet, substantially as described.

44. The combination of a toothed cylinder, a line-spacing lever, a pawl pivoted thereon to engage said teeth and having an arm projecting on the same side of the pivot as its point, but not in the path of the point, and a stop-lug adapted to engage said arm, whereby the pawl is stopped in its forward movement and at the same time is rigidly forced into engagement with the teeth to hold the cylinder from being thrown past the stop, substantially as described.

45. The combination of a ratchet-wheel, a pawl mounted to engage and revolve the same and having a projecting arm, and a stop-lug adapted to engage the said arm to pitch the pawl firmly into the ratchet in the act of stopping the pawl, substantially as described.

46. The combination of a ratchet-toothed cylinder, a pawl mounted to revolve the same and having a forward-projecting arm, and a pivoted stop having two lugs and a lever-arm, substantially as described, whereby either of the stops may be set into the path of the pawl-arm.

47. The combination of a ratchet-toothed cylinder, a pawl mounted to revolve the same, and a pivoted stop having two lugs and a lever-arm, whereby the stop may be turned to bring either lug into the path of the pawl, the said arm being formed also as a shelf on which the pawl normally rests and by which it is held disengaged, substantially as described.

48. The combination of a type-writing machine, top plate extending inward from the type-hangers and having a central circular aperture as a bearing, and a brush mounted on a frame having a journaled shoulder to removably engage the said plate-bearing and fitted to revolve therein, and further having a handle above the bearing, the brush extending below the bearing in position to engage the type-faces when in their normal circle of rest, substantially as described.

49. The combination of a circular-apertured top bearing-plate and a brush mounted on a frame having a journaled shoulder to fit and revolve in the said bearing, and further having a handle above the said bearing, whereby the brush may be revolved, substantially as described.

50. The combination of a brush-frame, a bearing in a type-writer machine for the same to revolve in, a brush pivoted near one end to the said frame, a crank-handle for the frame, a knob journaled upon the crank and having a ruffled edge, and connections between the brush and ruffled edge, substantially as described, whereby a vibrating motion is communicated to the brush by revolving the same with the crank.

51. The combination of a brush-frame, a bearing in a type-writer for the same to revolve in, a brush mounted in said frame for vertical movement, a crank-handle to the frame, a knob journaled upon the crank and having a ruffled edge, and connections between said ruffled edge and brush, substantially as described, whereby a vertically-reciprocating motion is given to the brush by revolving it with the crank.

52. The combination of a type-writer top plate having a central circular open bearing, a brush-frame having a disk provided with a shoulder journaled to fit the said bearing, and further having a shoulder at one edge to engage the under side of the plate, a brush hung to a downward arm, and a crank-handle upon said frame above the bearing, whereby the brush may be revolved with more or less pressure against the type-faces, substantially as described.

In testimony whereof we affix our signatures in presence of two witnesses.

CHARLES M. CLINTON.
JAMES McNAMARA.

Witnesses:
LEROY H. VAN KIRK,
M. E. PEARSON.

It is hereby certified that Letters Patent No. 449,616, granted March 31, 1891, upon the application of Charles M. Clinton and James McNamara, of Ithaca, New York, for an improvement in "Type-Writing Machines," was erroneously issued to said Clinton and McNamara as sole owners of the patent; whereas said Letters Patent should have been issued to *Charles M. Clinton, James McNamara, Dwight McIntire, Leroy H. Smith, and George Livermore,* said McIntire, Smith, and Livermore, being assignees of three-fifths interest as shown by the record of assignments in this office; and that said Letters Patent should be read with this correction therein that the same may conform to the record of the case in the Patent Office.

Signed, countersigned, and sealed this 21st day of April, A. D. 1891.

[SEAL.]
CYRUS BUSSEY,
*Assistant Secretary of the Interior.*

Countersigned:
NATHANIEL L. FROTHINGHAM,
*Acting Commissioner of Patents.*